(12) United States Patent
Trotta

(10) Patent No.: US 10,802,599 B2
(45) Date of Patent: *Oct. 13, 2020

(54) DEVICE WITH MM-WAVE GESTURE SENSING SYSTEM

(71) Applicant: Infineon Technologies AG, Neubiberg (DE)

(72) Inventor: Saverio Trotta, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/535,518

(22) Filed: Aug. 8, 2019

(65) Prior Publication Data

US 2019/0361535 A1    Nov. 28, 2019

Related U.S. Application Data

(63) Continuation of application No. 15/000,619, filed on Jan. 19, 2016, now Pat. No. 10,452,148.

(51) Int. Cl.
    G06F 3/01        (2006.01)
    G06F 1/16        (2006.01)

(52) U.S. Cl.
    CPC .............. *G06F 3/017* (2013.01); *G06F 1/163* (2013.01)

(58) Field of Classification Search
    None
    See application file for complete search history.

(56) References Cited

U.S. PATENT DOCUMENTS

| | | |
|---|---|---|
| 2010/0271187 A1 | 10/2010 | Uysal et al. |
| 2011/0304500 A1 | 12/2011 | Himmelstoss et al. |
| 2012/0313895 A1 | 12/2012 | Haroun et al. |
| 2014/0078694 A1 | 3/2014 | Wissmar |
| 2014/0139454 A1 | 5/2014 | Mistry et al. |
| 2015/0212198 A1 | 7/2015 | Nishio et al. |
| 2015/0346820 A1 | 12/2015 | Poupyrev et al. |
| 2016/0041618 A1 | 2/2016 | Poupyrev |
| 2016/0306034 A1 | 10/2016 | Trotta et al. |
| 2017/0052618 A1 | 2/2017 | Lee et al. |

FOREIGN PATENT DOCUMENTS

| | | |
|---|---|---|
| CN | 1463161 A | 12/2003 |
| CN | 203950036 U | 11/2004 |
| CN | 1716695 A | 1/2006 |
| CN | 101490578 A | 7/2009 |
| CN | 101585361 A | 11/2009 |
| CN | 102487608 A | 6/2012 |
| CN | 102788969 A | 11/2012 |

(Continued)

OTHER PUBLICATIONS

BGT24MTR11, "Using BGT24MTR11 in Low Power Applications," 24 GHz Radar, Application Note AN341, Revision: Rev. 1.0, Dec. 2, 2013, 25 pages.

(Continued)

*Primary Examiner* — Brian M Butcher
(74) *Attorney, Agent, or Firm* — Slater Matsil, LLP

(57) ABSTRACT

A device includes a frame, a first circuit board within the frame, and a display over and coupled to the first circuit board. The device further includes a second circuit board electrically coupled to the first circuit board, and a mm-wave gesture sensing system mounted on the second circuit board.

20 Claims, 9 Drawing Sheets

(56) References Cited

FOREIGN PATENT DOCUMENTS

| | | | |
|---|---|---|---|
| CN | 102967854 | A | 3/2013 |
| CN | 103529444 | A | 1/2014 |
| CN | 104919394 | A | 9/2015 |
| DE | 102008054570 | A1 | 6/2010 |
| DE | 102011075725 | A1 | 11/2012 |
| DE | 102014118063 | A1 | 7/2015 |
| GB | 2247799 | A | 3/1992 |
| JP | 2001174539 | A | 6/2001 |
| JP | 2004198312 | A | 7/2004 |
| JP | 2006234513 | A | 9/2006 |
| JP | 2008029025 | A | 2/2008 |
| JP | 2008089614 | A | 4/2008 |
| JP | 2009069124 | A | 4/2009 |
| JP | 2011529181 | A | 12/2011 |
| JP | 2012112861 | A | 6/2012 |
| JP | 2013521508 | A | 6/2013 |
| JP | 2014055957 | A | 3/2014 |
| JP | 2014523565 | A | 9/2014 |
| KR | 20090063166 | A | 6/2009 |
| KR | 20140082815 | A | 7/2014 |
| WO | 2007060069 | A1 | 5/2007 |
| WO | 2013009473 | A2 | 1/2013 |
| WO | 2015167260 | A1 | 11/2015 |
| WO | 2016033361 | A1 | 3/2016 |

OTHER PUBLICATIONS

Chen, X. et al., "Detection and Extraction of Target With Micro-motion in Spiky Sea Clutter via Short-Time Fractional Fourier Transform," IEEE Transactions on Geoscience and Remote Sensing, vol. 52, No. 2, Feb. 2014, pp. 1002-1018.

Chen, X. et al., "Detection and Extraction of Marine Target with Micromotion via Short-Time Fractional Fourier Transform in Sparse Domain," 5 pages.

Chuanhua, "Chinese Master's Thesis Full Text Database (Electronic Journal)," University of Electronic Science and Technology of China Masters Dissertation, Jul. 5, 2017, 14 pages.

Deacon, Peter et al., "Frequency Modulated Continuous Wave (FMCW) Radar," Design Team 6 Technical Lecture, Nov. 9, 2011, 27 pages.

Dham, Vivek, "Programming Chirp Parameters in TI Radar Devices," Texas Instruments, Application Report SWRA553, May 2017, 15 pages.

Diederichs, Kailtyn et al., "Wireless Biometric Individual Identification Utilizing Millimeter Waves," Microwave/Millimeter Wave Sensors, IEEE Sensors Letters vol. 1, No. 1, Feb. 2017, 4 pages.

"Dooring Alert Systems Riders Matter," Oct. 4, 2017, pp. 1-16.

Filippelli, Mario et al., "Respiratory Dynamics During Laughter," The American Physiological Society, 90: 1441-1446, 2001, 6 pages.

Fox, Ben, "The Simple Technique That Could Save Cyclists' Lives," Ventrix, Sep. 19, 2016, pp. 1-6.

Gu, Changzhan et al., "Assessment of Human Respiration Patterns via Noncontact Sensing Using Doppler Multi-Radar System," Open Access Sensors ISSN 1424-8220, May 9, 2015, 17 pages.

Gurcan, Yalin, "Super-Resolution Algorithms for Joint Range-Azimuth-Doppler Estimation in Automotive Radars," Jan. 25, 2017, 72 pages.

Inac, Ozgur et al., "A Phased Array RFIC With Built-In Self-Test Capabilities," IEEE Transactions on Microwave Theory and Techniques, vol. 60, No. 1, Jan. 2012, pp. 139-148.

Killedar, Abdulraheem, "XWR1xxx Power Management Optimizations—Low Cost LC Filter Solution," Texas Instruments Application Report SWRA577, Oct. 2017, 19 pages.

Kizhakkel, Vinit, "Pulsed Radar Target Recognition Based on Micro-Doppler Signatures Using Wavelet Analysis," 2013, 118 pages.

Kuehnke, Lutz, "Phased Array Calibration Procedures Based on Measured Element Patterns," 4 pages.

Lim, et al. "Expansion of Smartwatch Touch Interface from Touchscreen to Around Device Interface Using Infrared Line Image Sensors," Sensors 2015, 15(7), Published Jul. 9, 2015, pp. 16642-16653.

Lin, Jau-Jr et al., "Design of an FMCW Radar Baseband Signal Processing System for Automotive Application," Research Open Access SpringerPlus a SpringerOpen Journal, 2016, 16 pages.

"Single-Chip 24 GHz Radar Front End," Microwave Journal Frequency Matters, Feb. 13, 2014, 2 pages.

Qadir, Shahida et al., "Focused ISAR Imaging of Rotating Target in Far-Field Compact Range Anechoic Chamber," 14th International Conferences on Aerospace Sciences & Aviation Technology, ASAT, Paper ASAT-14-241-IP May 24-26, 2011, 7 pages.

Richards, Mark, "Fundamentals of Radar Signal Processing," Electronic Engineering, 2005, 93 pages.

Schroff, Florian et al., "FaceNet: A Unified Embedding for Face Recognition and Clustering," 2015, pp. 819-823.

Simon, W et al., "Highly Integrated KA-Band Tx Frontend Module Including 8x8 Antenna Array," 63 pages.

Suleymanov, Suleyman, "Design and Implement of an FMCW Radar Signal Processing Module for Automotive Applications," Master Thesis, Aug. 31, 2016, 64 pages.

Thayaparan, T. et al., "Micro-Doppler Radar Signatures for Intelligent Target Recognition," Defence Research and Development Canada, Sep. 2004, 73 pages.

Thayaparan, Thayananthan et al., "Intelligent Target Recognition Using Micro-Doppler Radar Signatures," 2009, vol. 7308, 11 pages.

Wilder, Carol et al., "Respiratory Patterns in Infant Cry," Human Communication Winter, 1974-75, pp. 18-34.

Xin, Qin et al., "Signal Processing for Digital Beamforming FMCW SAR," Research Article, 2014, 11 pages.

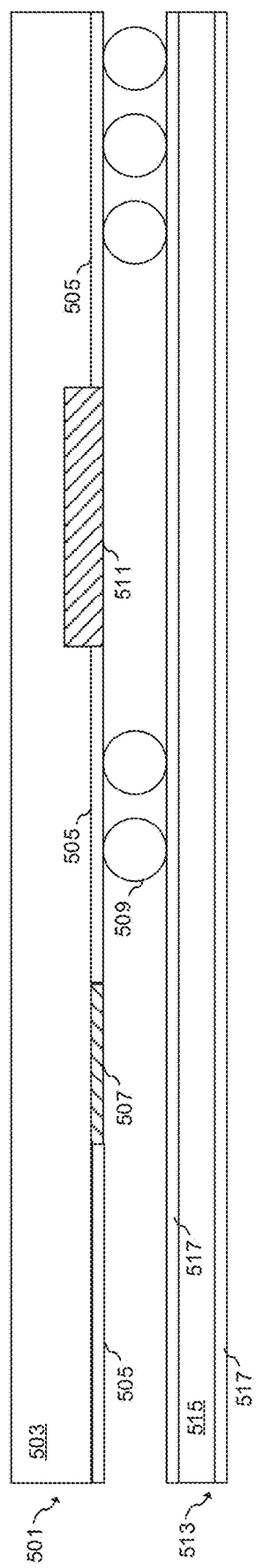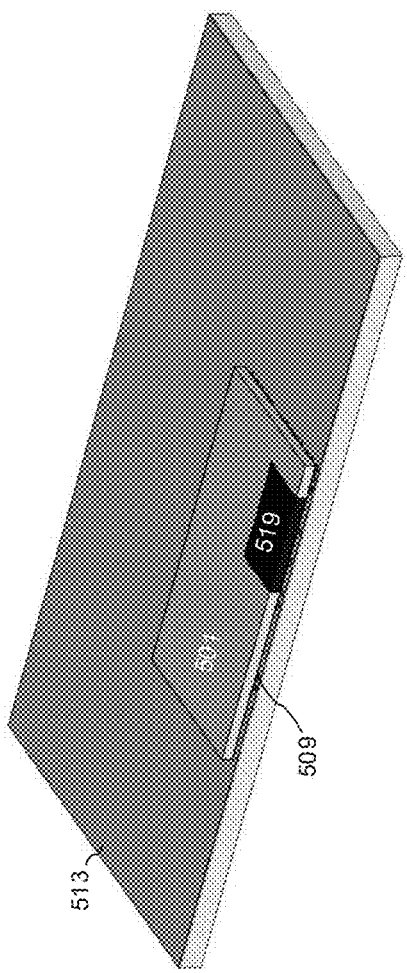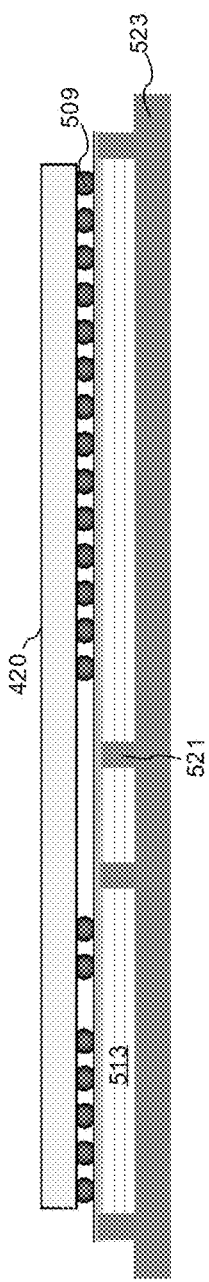
FIG. 5A
FIG. 5B
FIG. 5C

DEVICE WITH MM-WAVE GESTURE SENSING SYSTEM

PRIORITY CLAIM AND CROSS-REFERENCE

This application is a continuation and claims the benefit of U.S. application Ser. No. 15/000,619, filed on Jan. 19, 2016, which application is hereby incorporated herein by reference.

TECHNICAL FIELD

The present disclosure relates generally to an electronic device, and more particularly to a wearable consumer device.

BACKGROUND

Wearable consumer devices such as smart watches, activity monitors and health monitors have become popular in the past few years due to the rapid advancement in low cost semiconductor technologies. Such wearable consumer devices are integrating more and more features while form factors stay same or are further reduced. Accordingly, new types of interfaces and new ways to interact with wearable consumer devices are needed.

In some wearable consumer devices an RF radar system is employed to function as an interface. In some radar systems, the distance between the radar and a target is determined by transmitting a frequency modulated signal, receiving a reflection of the frequency modulated signal, and determining a distance based on a time delay and/or frequency difference between the transmission and reception of the frequency modulated signal. Accordingly, some radar systems include a transmit antenna to transmit the RF signal, a receive antenna to receive the RF, as well as the associated RF circuitry used to generate the transmitted signal and to receive the RF signal. In some cases, multiple antennas may be used to implement directional beams using phased array techniques.

SUMMARY

According to an embodiment, a wearable device includes a frame, a first circuit board within the frame, and a display over and coupled to the first circuit board. The wearable device further includes a second circuit board electrically coupled to the first circuit board, and a mm-wave gesture sensing system mounted on the second circuit board.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5A, 5B and 5C illustrate an RF system/antenna package and a corresponding circuit board in accordance with some embodiments;

Figure 1:
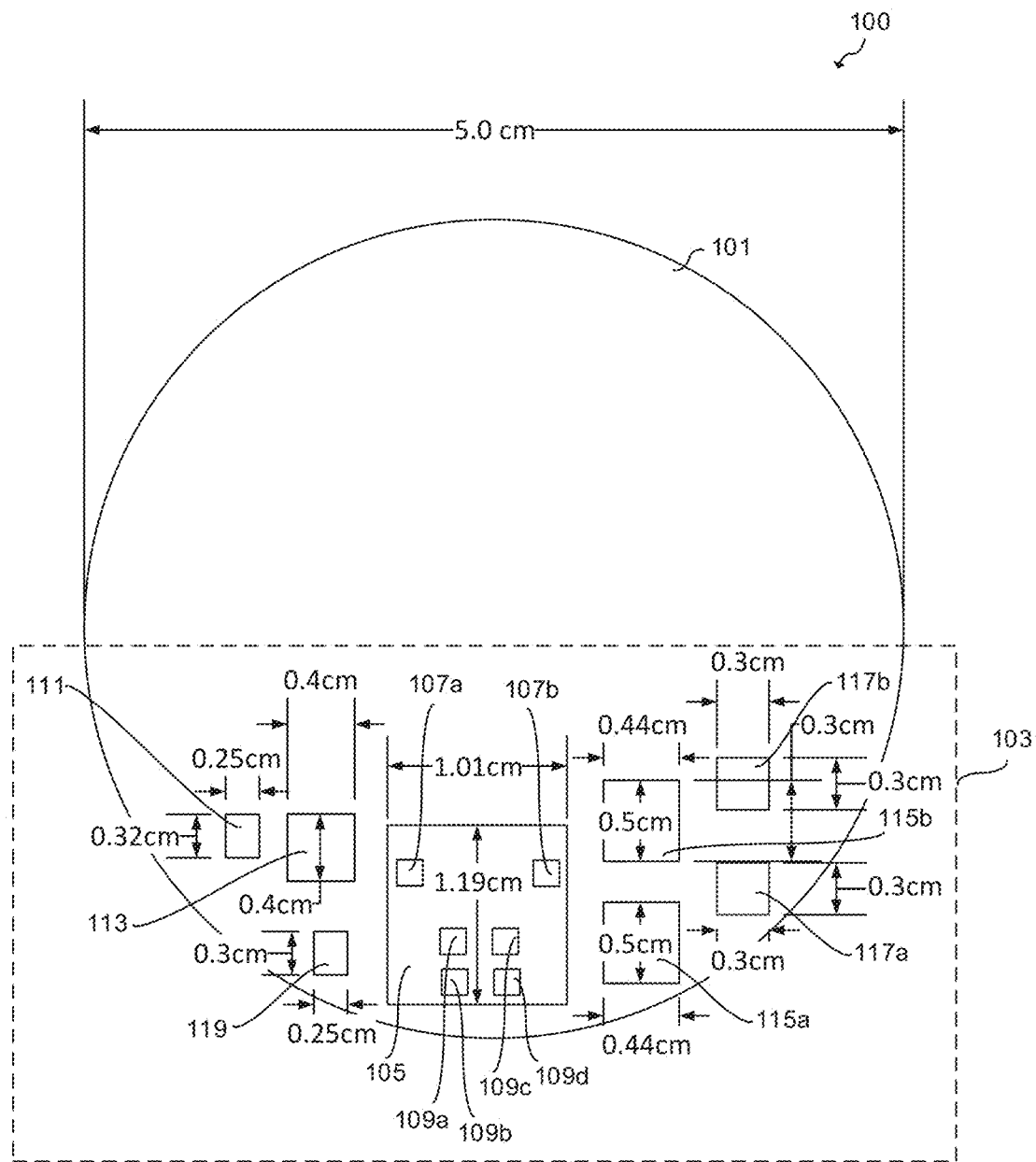
FIG. 1 illustrates a plan view of a circuit board of a wearable device in accordance with some embodiments.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a wearable consumer device with a gesture sensing system and a method of forming such a wearable consumer device. In particular, various embodiments below will be described with respect to a smart watch having a gesture sensing system. The invention may also be applied to other systems and applications, such other wearable/portable consumer devices and non-portable consumer devices.

In embodiments of the present invention, a gesture sensing system is integrated into a wearable device. In various embodiments, the gesture sensing system may be implemented using mm-wave RF circuits to produce a mm-wave gesture sensing system. In an embodiment, the gesture sensing system includes a high frequency RF system, including RF circuitry and antennas, which is implemented in a single ball grid array (BGA) package. The RF system includes an integrated circuit having a receive interface on a first edge of chip and transmit interfaces on adjacent or opposite edges of the chip. A multi-element patch antenna is disposed on a surface of the package adjacent to the first edge of the chip, and is coupled to multiple receive channel interfaces at the first edge of the chip. Similarly, patch antennas for transmitting signals are disposed on the redistribution layer of the package on the adjacent or opposite edges of the chip adjacent to the transmit interfaces. In other embodiments of the present invention, the integrated circuit may be mounted directly on a circuit board adjacent to a multi-element patch antenna disposed on the circuit board. Such an RF system has been described in U.S. application Ser. No. 14/954,198, filed on Nov. 30, 2015, which application is hereby incorporated herein by reference in its entirety.

In an embodiment, beam forming concepts, which are widely used in radar systems, may be used to impart beam steering and directionality to the transmission and reception of RF signals. Such embodiments may be applied, for example, to automotive radar systems, camera systems, portable systems, wearable systems, TV sets, tablet computers, and other applications. For example, in a camera system, the radar system may be used to determine a distance to a photographed object in order to determine focus and exposure settings. This distance may be determined accurately and with high resolution using an embodiment 60 GHz radar system with a bandwidth of between about 2 GHz and about 8 GHz, for example, about 7 GHz bandwidth. Such distance information may also be used for a smart sensing system where the radar ranging data are merged with camera data.

Embodiment beam forming concepts may also be used to implement a gesture recognition system. In the past, gesture recognition systems have been implemented using optical cameras, pressure sensors, PALs and other devices. By using embodiment radar systems, a gesture recognition system may perform accurate distance measurements, while being conveniently hidden behind an opaque cover made of plastic or other sturdy materials.

In an embodiment, a gesture sensing system is integrated onto a main circuit board of a wearable device such as a smart watch. In such embodiments, a display of the smart watch is properly reshaped to expose a portion of the main circuit board having the gesture sensing system. By exposing the gesture sensing system, unhindered transmission and reception of RF signals are ensured.

In another embodiment, a gesture sensing system is integrated at a junction of a smart watch with a watch band. In such embodiments, the gesture sensing system is mounted onto a circuit board, which is different from the main circuit board of the smart watch and which is placed at an angle with respect to a main circuit board of the smart watch. The circuit board of the gesture sensing system is electrically coupled to the main circuit board of the smart watch using a flexible connector. In addition, in such embodiments, reshaping of the display is not required, since the gesture sensing system is not covered by the display.

FIG. 1 illustrates a plan view of a main circuit board 101, including a gesture sensing system 103, of a wearable device 100 in accordance with some embodiments. For clarity of presentation, only components of the gesture sensing system 103 are illustrated. One of ordinary skill in the art will appreciate that the main circuit board 101 may include various components depending on functional requirement of the wearable device 100. In some embodiments, the main circuit board 101 may include various application specific integrated circuits (ASICs), various components for powering and controlling a display (not illustrated in FIG. 1, see FIG. 2) of the wearable device 100, various sensors such a motion sensor, a pressure sensor, a temperature sensor, a humidity sensor, a touch sensor, a heart rate sensor, or the like, various interface components such as USB, WiFi, WiGig, Bluetooth, or the like, various power management components, and a power source such as, for example, a battery.

In some embodiments, the gesture sensing system 103 includes an RF system 105. The RF system 105 is configured to transmit an incident RF signal toward an object, such for example a hand of a consumer, via transmit antennas 107a and 107b, and receive a reflected RF signal from the object via receive antennas 109a-d. The RF system 105 further includes a receiver front end (not shown) coupled to the receive antennas 109a-d and a transmitter front end (not shown) coupled to the transmit antennas 107a and 107b. The RF system 105 provides signals to be transmitted to the transmitter front end and receives and/or processes signals received by the receiver front end. In some embodiments, the RF system 105 may be implemented in a package that contains the transmitter front end, the receiver front end, as well as the transmit antennas 107a and 107b, and the receive antennas 109a-d. In some embodiments, the frequency of operation of the RF system 105 is between about 57 GHz and about 66 GHz. Alternatively, embodiment systems may operate at frequencies outside of this range also. In an embodiment, a maximum range of the gesture sensing system 103 is about 5 m to about 10 m. The RF system 105 is described in greater detail in U.S. application Ser. No. 14/954,198, and the description is not repeated herein.

Referring further to FIG. 1, the gesture sensing system 103 further includes a crystal oscillator (Xtal) 111 and a phase locked loop (PLL) circuit 113, which are configured as a clock generation circuit that may be shared between various elements of the gesture sensing system 103. The gesture sensing system 103 further includes baseband amplifiers 115a and 115b and analog-to-digital converters (ADCs) 117a and 117b, which are configured to amplify and digitize output signals of the RF system 105. The switch 119 is configured to couple the RF system 105 to a power management integrated circuit (PMIC) (not shown in FIG. 1, see FIG. 4) of the wearable device 100. In some embodiments, a total area of all components of the gesture sensing system 103 is about 218.5 mm$^2$. Accordingly, at least 218.5 mm$^2$ of the main circuit board 101 is required for the gesture sensing system 103. In other embodiments, a footprint of the gesture sensing system 103 may be further reduced by integrating the baseband amplifiers 115a and 115b and the ADCs 117a and 117b in the RF system 105. Dimensions of various components as shown in FIG. 1 are for illustrative purposes only and may vary according to design requirements of the gesture sensing system 103 and the wearable device 100.

Figure 2:
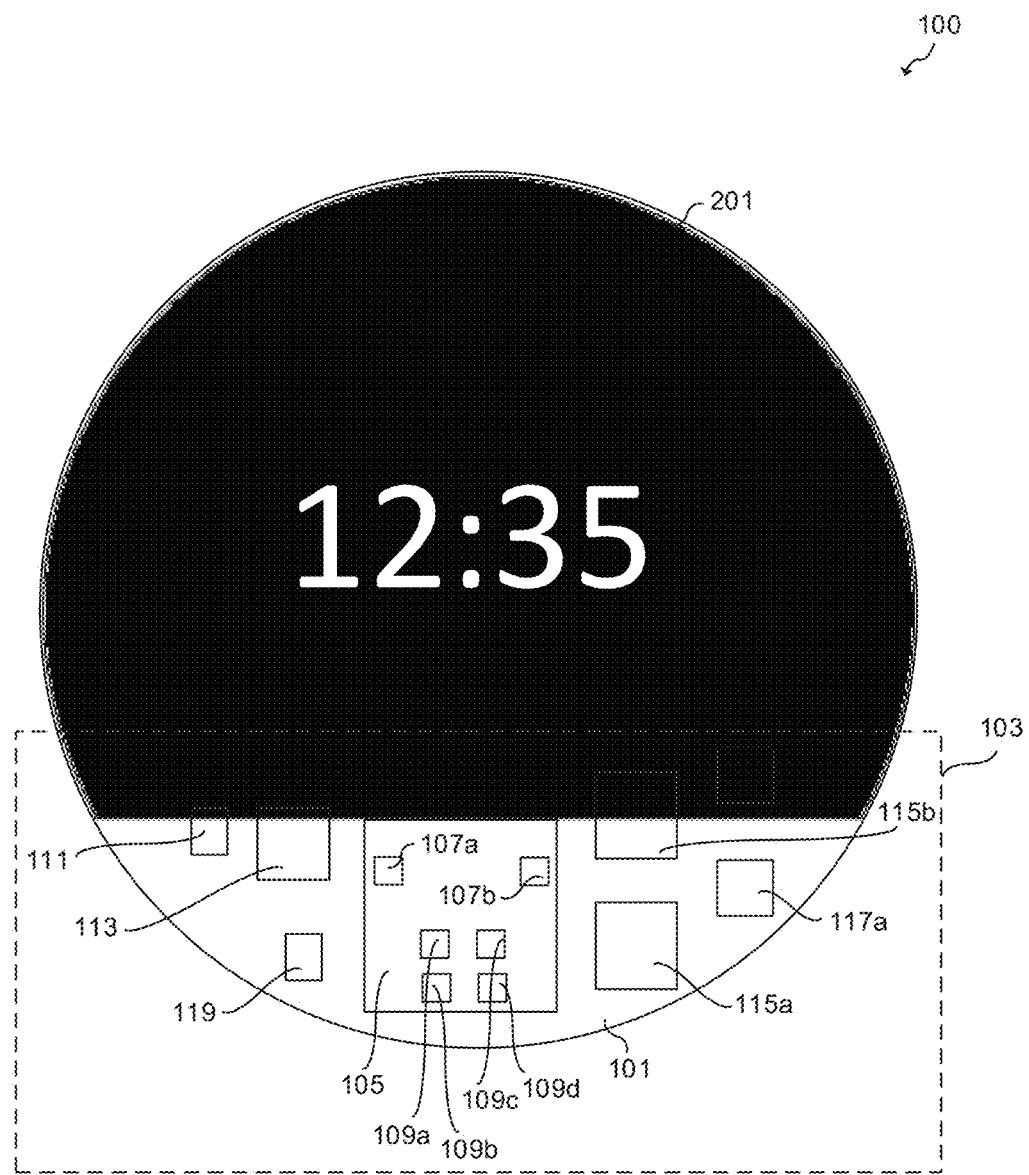
FIG. 2 illustrates a plan view of a wearable device in accordance with some embodiments.

FIG. 2 illustrates a plan view of the wearable device 100 in accordance with some embodiments. In some embodiments, the wearable device 100 includes a display 201 coupled to the main circuit board 101. The display 201 may be a liquid crystal display (LCD), a light-emitting diode (LED) display, an active-matrix organic light-emitting diode (AMOLED) display, or the like. In the illustrated embodiment, the display 201 is shaped such that the RF system 105 of the gesture sensing system 103 is not covered by the display 201. Accordingly, RF signals transmitted or received by the RF system 105 are not blocked or attenuated by the display 201. In the illustrated embodiment, the display 201 may have a shape of a circle with a segment removed as viewed from top. In alternative embodiments, the display 201 may have a square shape, a rectangular shape, or the like. Dimensions of various components as shown in FIG. 2 are for illustrative purposes only and may vary according to design requirements of the gesture sensing system 103 and the wearable device 100.

Figure 3A:
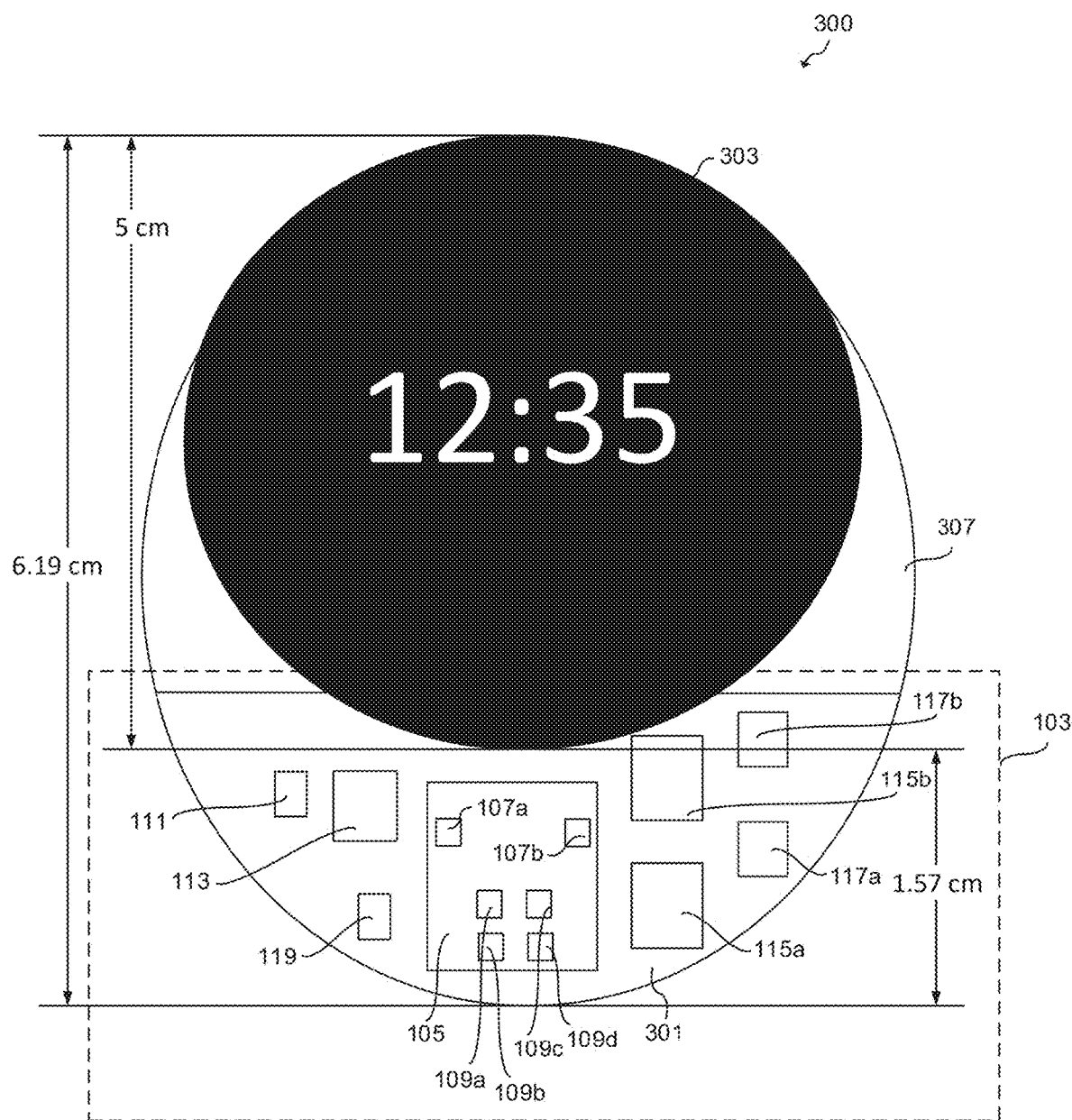
FIGS. 3A and 3B illustrate plan and cross-sectional views of a wearable device in accordance with some embodiments.
Figure 3B:
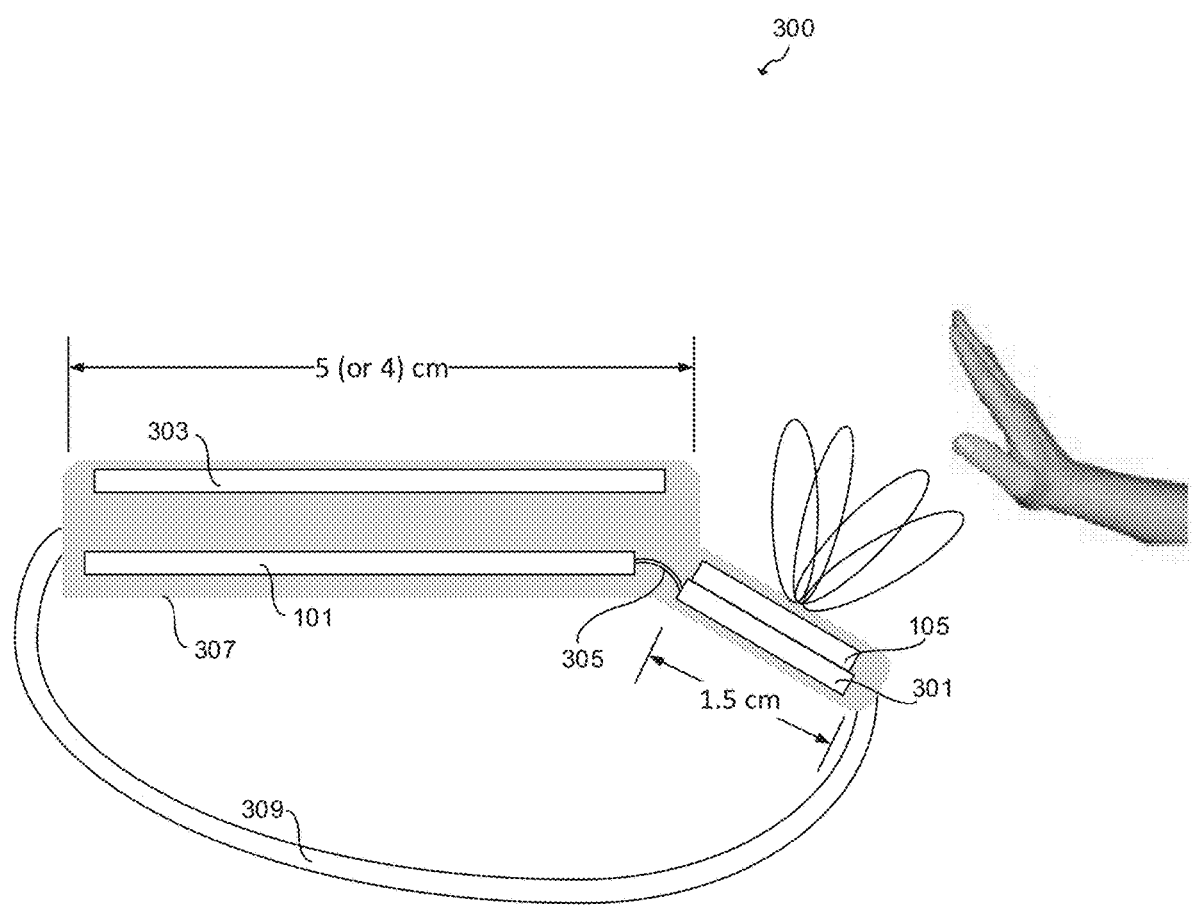

FIGS. 3A and 3B illustrate plan and cross-sectional views, respectively, of a wearable device 300 in accordance with some embodiments. In the illustrated embodiment, the gesture sensing system 103 is formed on a circuit board 301 different from the main circuit board 101 of the wearable device 300. The circuit board 301 is placed at a junction of a frame 307 of the wearable device 300 with a band 300 of the wearable device 300 and may form an angle with the main circuit board 101. In an embodiment, an angle between the circuit board 301 and main circuit board 101 is between about 30 deg and about 60 deg. The circuit board 301 is electrically coupled to the main circuit board 101 using a flexible connector 305, which allows for adjusting the angle between the circuit board 301 and the main circuit board 101. The wearable device 300 includes a display 303, which covers the main circuit board 101 while the gesture sensing system 103 mounted on the circuit board 301 is exposed.

The display 303 may be an LCD, an LED display, an AMOLED display, or the like. By placing the gesture sensing system 103 at the junction of the wearable device 300 with the band, reshaping of the display 303 is not required to expose the gesture sensing system 103, and the display 303 may have a circular shape as viewed from top. In alternative embodiments, the display 201 may have a square shape, a rectangular shape or the like. In an embodiment, a top part surrounding the display 303 and a sidewalls of a frame 307 of the wearable device 300 may formed of a high thermal conductivity material such as a metal for improved thermal management as described below in great detail with respect to FIGS. 5A, 5B and 5C. A portion of the frame 307 covering RF system 105 of the gesture sensing system 103 is formed of a material transparent for millimeter waves to ensure proper operation of the gesture sensing system 103. Furthermore, a lower portion of the frame 307, which is in contact with skin of a consumer while worn, may be formed of a low thermal conductivity material to avoid discomfort or bodily harm to the skin of the consumer. Dimensions of various components as shown in FIGS. 3A and 3B are for illustrative purposes only and may vary according to design requirements of the gesture sensing system 103 and the wearable device 300.

Figure 4:
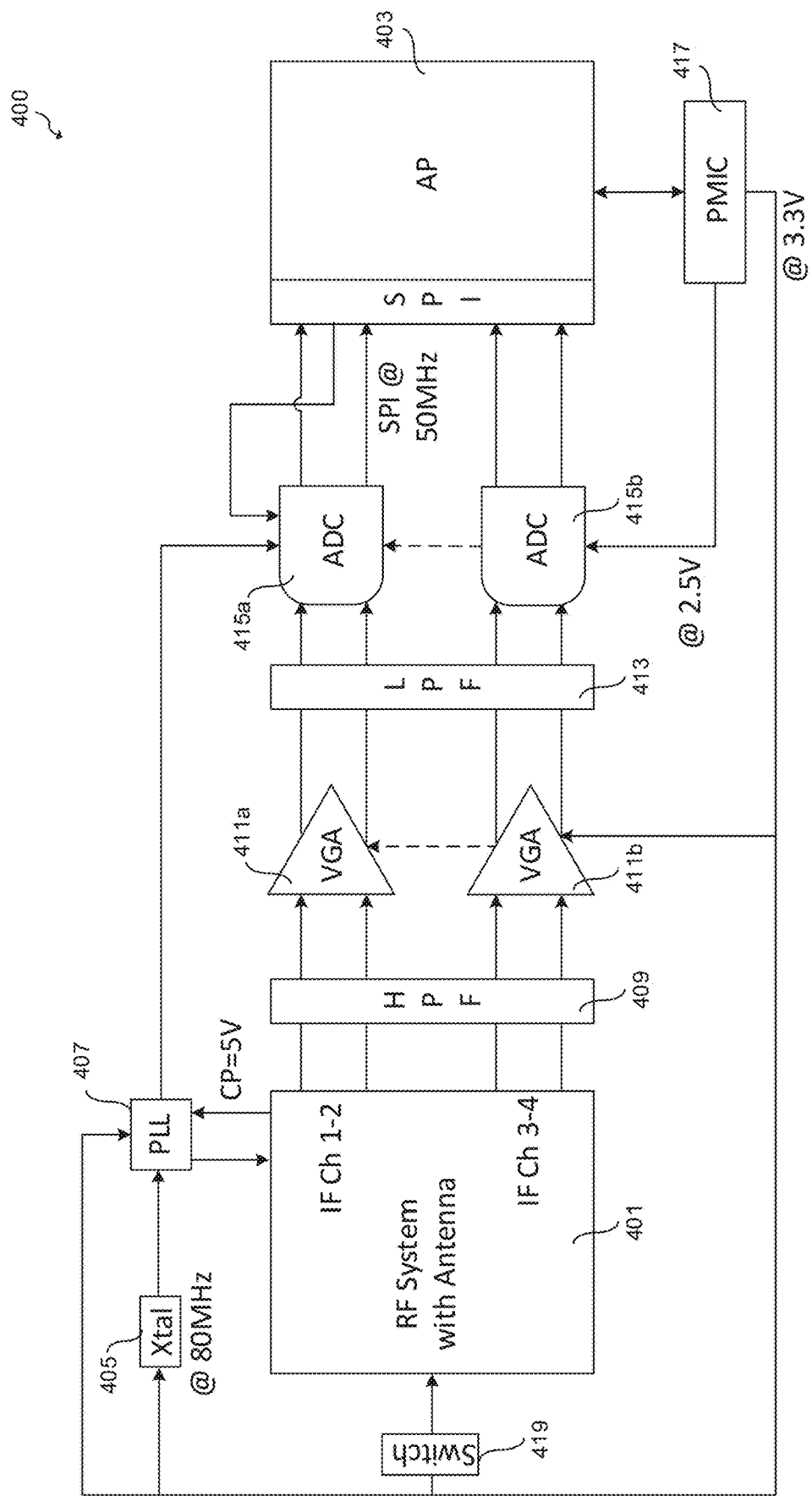
FIG. 4 illustrates a block diagram of a gesture sensing system in accordance with some embodiments.

FIG. 4 illustrates a block diagram of a gesture sensing system 400 in accordance with some embodiments. As shown, the gesture sensing system 400 includes an RF system 401 coupled to an application processor (AP) circuit 403. The RF system 401 is configured to transmit an RF signal to a target (not shown) and receive a reflected RF signal from the target. The AP circuit 403 is configured to process an output signal form the RF system 401 and send instruction signals to various components of a wearable device, such as the wearable device 300 illustrated in FIGS. 3A and 3B, based on a detected gesture. In some embodiments, to the RF system 401 is a multichannel system configured to output a plurality of intermediate frequency (IF) signals, such as IF Ch 1-4 illustrated in FIG. 4. The gesture sensing system 400 further includes a high pass filter (HPF) 409, variable gain amplifiers (VGAs) 411a and 411b, a low pass filter (LPF) 413 and analog-to-digital converters (ADCs) 415a and 415b, which are configured to filter, amplify and digitize IF signals of the RF system 401 and provide a digitized signal to the AP circuit 403 for further processing. In the illustrated embodiment, the HPF 409 and the LPF 413 are four channel filters. However, in other embodiments, the HPF409 and the LPF 413 may be configured to have other number of channels depending on a channel number of the RF system 401. In the illustrated embodiment, the VGAs 411a and 411b are two channel VGAs and the ADCs 415a and 415b are two channel ADCs. However, in other embodiments, the VGAs 411a and 411b may be implements as a single four channel VGA and the ADCs 415a and 415b may be implemented as a single four channel ADC. The ADCs 415a and 415b are coupled to the AP circuit 403 through a serial peripheral interface (SPI). In the illustrated embodiment, the SPI of the AP circuit 403 is configured as a multi I/O SPI to accommodate four digitized signals corresponding to four IF signals Ch 1-4 of the RF system 401 for parallel sampling. In another embodiment in which the SPI is a single I/O SPI, the ADCs 415a and 415b may be implemented as a single multiplexer (MUX) ADC for serial sampling.

In an embodiment, VGAs 411a and 411b is coupled between the IF output of the RF system 491 and the ADCs 415a and 415b in order to scale gain of the IF signals such that the full dynamic range of the IF signals corropds to full scale inputs of ADCs 415a and 415b. The HPF 409 and LPF 413 may be coupled prior to the ADCs 415 a and 415b in order to prevent aliasing and/or to limit the frquency content of the IF signals to a scanning range of interest. For example, in one embodiment, the HPF 409 and LPF 413 are configured to have a minimum frequency of about 8 KHz and a maximum frequency of about 250 KHz in order to limit the frequency content to a scanning range of interest, such as 5 cm to 1 m. Alternatively, other bandwidths may be used to facilitate other scanning ranges.

The gesture sensing system 400 further includes a crystal oscillator (Xtal) 405 and a phase locked loop (PLL) circuit 407, which are configured as a clock generation circuit that may be shared between various elements of the gesture sensing system 400. The clock generation circuit provides a clock signal to the RF system 401 to be mixed with the reflected RF signal from the target and output IF signals, such as IF Ch 1-4, for further processing. The clock generation circuit further provides a clock signal to the ADCs 415a and 415b. In the illustrated embodiment, Xtal 405 produces a frequency of 80 MHz, however, other crystal oscillator frequencies may be used in other embodiments.

The gesture sensing system 400 further includes a power management integrated circuit (PMIC) 417 configured to provide various DC voltages to various elements of the gesture sensing system 400. For example, the PMIC 417 may be configured to provide DC voltages of about 3.3 V to the VGAs 411a and 411b, the Xtal 405, the PLL circuit 407, and the RF system 401 through a switch 419 coupled between the RF system 401 and the PMIC 417. The PMIC 417 may be configured to provide a DC voltage of about 2.5 V to the ADCs 415 a and 415b. It should be understood that 2.5 V and 3.3 V are only illustrative examples and other voltages may be generated in other embodiments systems. A method of operation of an RF systems such as the RF system 401 is described in greater detail in U.S. application Ser. No. 14/954,198, and the description is not repeated herein.

FIGS. 5A, 5B and 5C illustrate an embodiment RF system/antenna package 501 and a corresponding circuit board 513 in accordance with some embodiments. FIG. 5A illustrates a cross-sectional view of the embodiment RF system/antenna package 501 disposed on the circuit board 513. In a specific embodiment directed toward an embedded wafer level (eWLB) ball grid array (BGA) package, RF system/antenna package 501 includes a molding material layer 503 that is about 450 μm thick and a low temperature coefficient (LTC) layer 505 disposed beneath molding material layer that is about 20 μm thick. Various patch antennas are implemented using a 7.5 μm redistribution layer (RDL) 507. In an embodiment, an RF chip 511 that includes the various transmit and receive circuits is disposed within the molding material layer 503. In some embodiments, the RF system/antenna package 501 may include further conductive layers, such as RDLs, used for routing and/or for the implementation of various passive devices within the package. In alternative embodiments of the present invention, other package types such as a BGA or advanced thin small leadless (ATSPL) package may also be used.

In an embodiment, the RF system/antenna package 501 is mounted on the circuit board 513 using solder balls 509. The circuit board 513 may be implemented using an insulating substrate 515 having one or more thin conductive layers 517 laminated on one or both sides of the insulating substrate 515. The one or more thin conductive layers 517 are etched to form circuitry interconnections of the circuit board 513. The one or more thin conductive layers 517 may be configured as ground, power and/or signal layers. In an embodiment, the insulating substrate 515 is formed of FR4 and the one or more thin conductive layers 517 are formed of copper. Alternatively, other insulating materials, such as Rogers PCB material, or conductive materials may be used form the circuit board 513. In some embodiments, the circuit board 513 may include additional conductive and insulating layers as known in the art. In an embodiment described above with respect to FIGS. 1 and 2, the circuit board 513 is implemented as the main circuit board 101 of the wearable device 100. In an embodiment described above with respect to FIGS. 3A and 3B, the circuit board 513 is implemented as the circuit board 301, which is different from the main circuit board 101 of the wearable device 300. In an embodiment, at thickness of a device including the RF system/antenna package 501 and the circuit board 513 is less than about 2 mm.

FIG. 5B illustrates a three-dimensional view of the RF system/antenna package 501 mounted on the circuit board 513 in accordance with some embodiments. The section of the RF system/antenna package 501 that houses the RF chip 511 is denoted as a region 519 to show the relative position of the RF chip 511 to the remaining portions of the RF system/antenna package 501. FIG. 5C illustrates a cross-sectional view of the RF system/antenna package 501 mounted on the circuit board 513 using the solder balls 509 in accordance with some embodiments. The circuit board 513, in addition to electrically interconnecting various components mounted to thereon, dissipates heat produced by the various components. In an embodiment, the RF system/antenna package 501 has a thermal resistance of about 3K/W and consumes about 1 W in an idle state. In an embodiment, the gesture sensing system 103 consumes about 1.3 W in an idle state. In an embodiment, a gesture sensing system may dissipate several hundred mW during operation. In some embodiments, a thermal resistance of the circuit board 513 may not be low enough to efficiently transfer heat produced by the RF system/antenna package 501 and various components of the gesture sensing system. In such embodiments, thermal vias 521 may be formed through the circuit board 513 and may be coupled to a heat sink 523. The thermal vias 521 may be electrically inert and are configured to transfer heat form the RF system/antenna package 501 to the heat sink 523. In an embodiment, the thermal vias 521 and the heat sink 523 may be formed of a material having a high thermal conductivity (or a low thermal resistivity), such as copper, aluminum, or the like. In some embodiments, the heat sink 523 may be thermally coupled (using, for example, a thermal paste) or may be a part of the frame 307 of the wearable device 300 (see FIGS. 3A and 3B). In such embodiments, the frame 307 of the wearable device 300 may not cover the gesture sensing system 103 and a bottom of the wearable device 300, which is in contact with skin while worn by a consumer.

It should be understood that the various example physical dimensions and the various materials used for the various layers of the RF system/antenna package 501 and the circuit board 513 on which the RF system/antenna package 501 is disposed are only specific examples. In alternative embodiment of the present invention, other physical dimensions and suitable materials may be used for the various layers.

Figure 6:
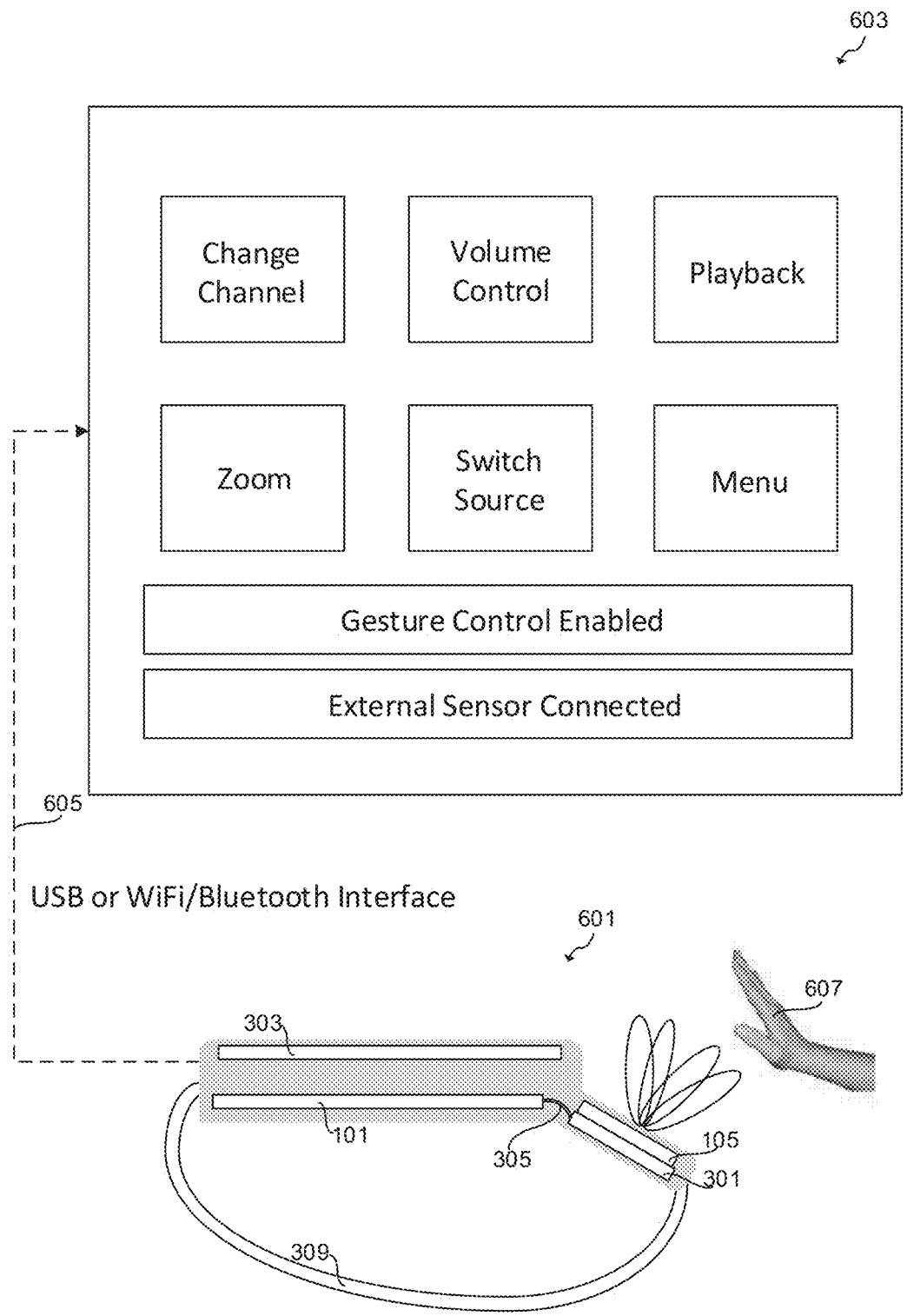
FIG. 6 illustrates a wearable device connected to a consumer device in accordance with some embodiments.

FIG. 6 illustrates an embodiment wearable device 601 connected to a consumer device 603 in accordance with some embodiments. The wearable device 601 may be formed using similar materials and methods as the wearable device 300 described above with respect to FIGS. 3A and 3B, and the description is not repeated herein. The consumer device 603 may include a TV set, a smart monitor, a tablet computer, a navigation system, a camera, or the like. The wearable device 601 is connected to the consumer device 603 using an interface 605 and may be configured to act a remote control for the consumer device 603. In an embodiment, the interface 605 may be a wired interface such as USB, or a wireless interface such as 2.5 GHz or 60 GHz based interface, WiFi, WiGig, Bluetooth, or the like. In an embodiment in which the interface 605 is a wired interface, the wearable device 601 may not be worn and may be placed in proximity of the consumer device 603, where a distance between the wearable device 601 and the consumer device 603 is limited by a length of the wired interface 605. The wearable device 601 may be configured to remotely control various functions of the consumer device 603. For example, volume, playback, source, channel, or the like of the consumer device 603 may be controlled using an appropriate gesture 607 detected by the RF system/antenna system 105 of the wearable device 601.

Figure 7:
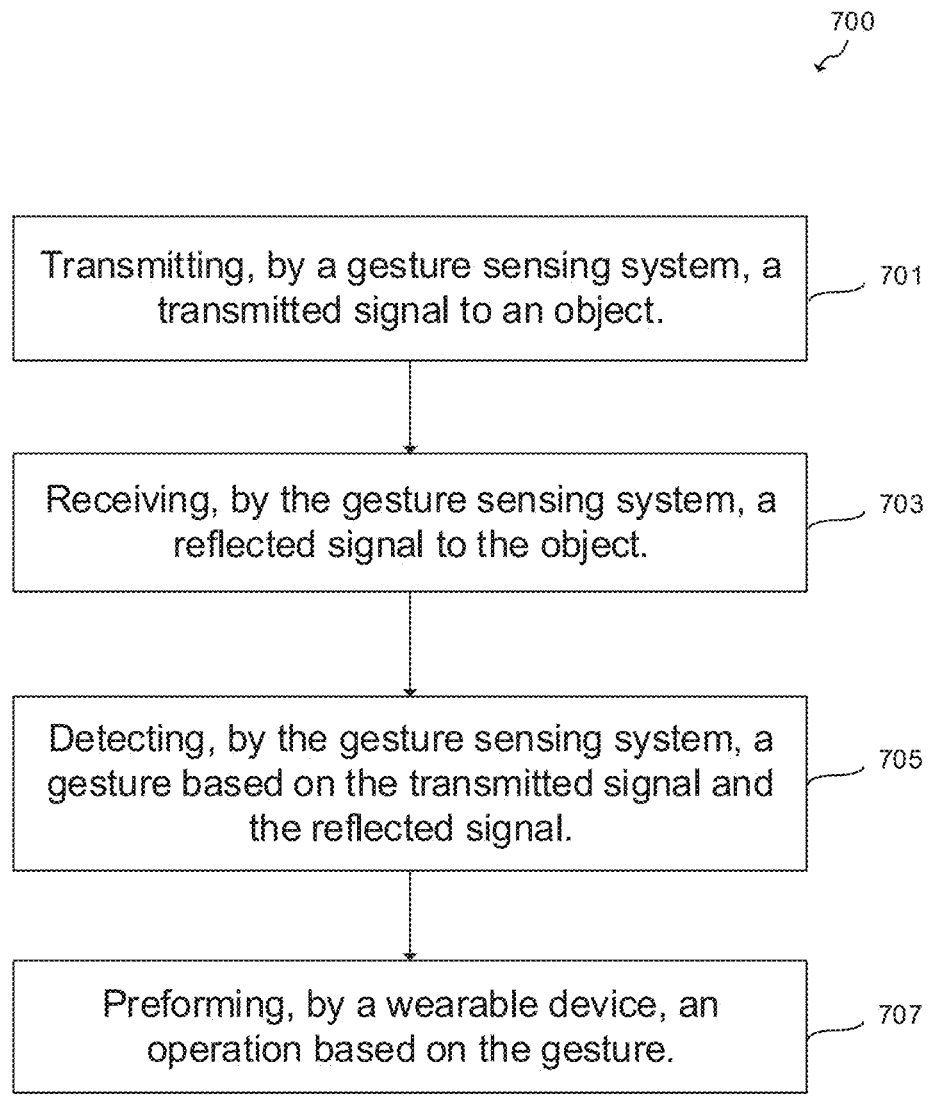
FIG. 7 illustrates a flow diagram of a method of operating a wearable device in accordance with some embodiments.

FIG. 7 illustrates a flow diagram of a method 700 of operating a wearable device in accordance with some embodiments. The method 700 starts at step 701, where a gesture sensing system (such as, for example, the gesture sensing system 400 illustrated in FIG. 4) of a wearable device (such as, for example, the wearable device 601 illustrated in FIG. 6) transmits a transmitted signal to an object. In an embodiment, a plurality of transmit antennas (such as, for example, the transmit antennas 107a and 107b illustrated in FIG. 1) of the gesture sensing system transmit the transmitted signal to the object. In step 703, the gesture sensing system of the wearable device receives a reflected signal from the object. In an embodiment, a plurality of receive antennas (such as, for example, the receive antennas 109a-d illustrated in FIG. 1) of the gesture sensing system receive the reflected signal from the object. In step 705, the gesture sensing system detects a gesture based on the transmitted signal and the reflected signal. In an embodiment, the gesture sensing system may compare the reflected signal to the transmitted signal to detect the gesture. In step 707, the wearable device performs an operation based on the gesture.

Figure 8:
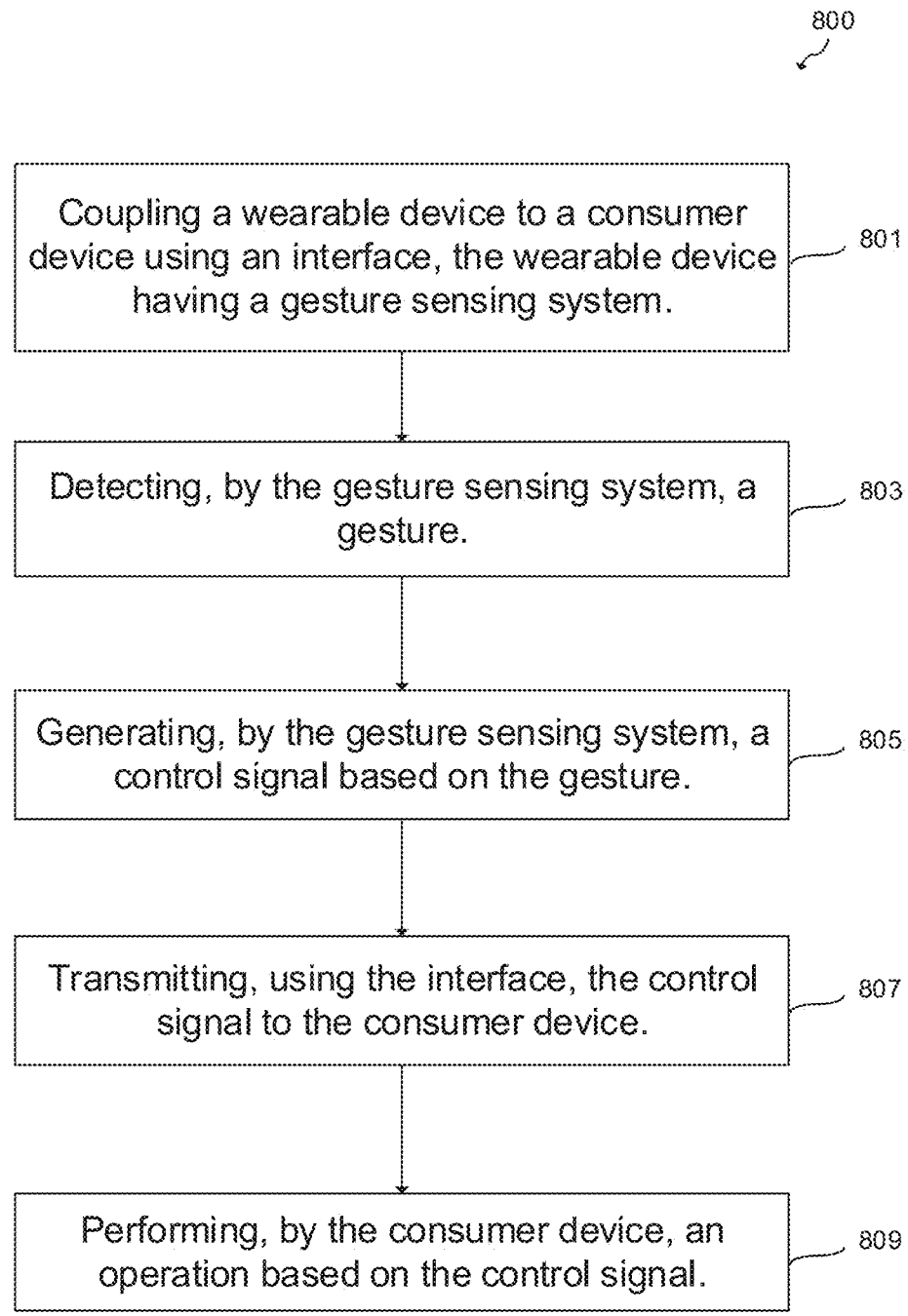
FIG. 8 illustrates a flow diagram of a method of operating a wearable device as a remote control in accordance with some embodiments.

FIG. 8 illustrates a flow diagram of a method 800 of operating a wearable device as a remote control in accordance with some embodiments. The method 800 starts at step 801, where a wearable device (such as, for example, the wearable device 601 illustrated in FIG. 6) is paired or coupled to a consumer device (such as, for example, the consumer device 603 illustrated in FIG. 6) using an interface (such as, for example, the interface 605 illustrated in FIG. 6). In step 803, a gesture is detected by a gesture sensing system (such as, for example, the gesture sensing system 400 illustrated in FIG. 4) of the wearable device. In an embodiment, a plurality of transmit antennas (such as, for example, the transmit antennas 107a and 107b illustrated in FIG. 1) of the gesture sensing system transmit a transmitted signal to an object and a plurality of receive antennas (such as, for example, the receive antennas 109a-d illustrated in FIG. 1) of the gesture sensing system receive a reflected signal from the object. The gesture sensing system processes the transmitted and received signals to detect the gesture. In an embodiment, the gesture sensing system may compare the reflected signal to the transmitted signal to detect the gesture. In step 805, the gesture sensing system generated a control signal based on the detected gesture. In step 807, the control signal is transmitted through the interface to the consumer device. In step 809, the consumer device performs an operation based on the control signal.

Embodiments of the present invention are summarized here. Other embodiments can also be understood form the entirety of the specification and the claims filed herein. One general aspect includes a wearable device including: a frame, a first circuit board within the frame, a display over and coupled to the first circuit board, a second circuit board electrically coupled to the first circuit board, and a mm-wave gesture sensing system mounted on the second circuit board.

Implementations may include one or more of the following features. The wearable device where the first circuit board and the second circuit board are electrically coupled using a flexible connector. The wearable device where a major surface of the second circuit board forms an angle with a major surface of the first circuit board, the angle being between about 0 deg and about 60 deg. The wearable device further including: a plurality of thermal vias in the second circuit board; and a heat sink coupled to the plurality of thermal vias, where the heat sink is thermally coupled to the frame of the wearable device. The wearable device where the plurality of thermal vias and the heat sink include a metal. The wearable device where the mm-wave gesture sensing system includes an RF system, the RF system including: a plurality of receive antennas; a plurality of transmit antennas; and a front-end circuit including a plurality of receive circuits coupled to the plurality of receive antennas and a plurality of transmit circuits coupled to the plurality of transmit antennas. The wearable device where the mm-wave gesture sensing system further includes: a clock circuit coupled the RF system; a plurality of amplifiers coupled to RF system; a plurality of analog-to-digital converters coupled to corresponding outputs of the plurality of amplifiers; and an application processor coupled to outputs of the plurality of analog-to-digital converters. The wearable device where the RF system is a package, the package including: an RF chip embedded in a molding layer; one or more redistribution lines over the RF chip and the molding layer; and a plurality of connectors coupled to one or more redistribution lines. The wearable device where the plurality of receive antennas and the plurality of transmit antennas are formed within one or more redistribution layers. The wearable device where the RF system is mounted on the second circuit board using the plurality of connectors. The wearable device where the second circuit board is placed at a junction between the frame and a band of the wearable device. The wearable device where a sidewall and a top portion of the frame surrounding the display include a metal. The wearable device where a portion of the frame over the mm-wave gesture sensing system is formed of a plastic. The wearable device where a maximum range of the mm-wave gesture sensing system is between about 5 m and about 10 m.

A further general aspect includes a wearable device including: a frame; a circuit board within a frame; a mm-wave gesture sensing system mounted on a first portion the circuit board; and a display coupled to the circuit board, the display being disposed over a second portion of the circuit board.

Implementations may include one or more of the following features. The wearable device where the first portion of the circuit board is separate from the second portion of the circuit board, and where the first portion of the circuit board and the second portion of the circuit board are electrically coupled using a flexible connector. The wearable device further including: a plurality of thermal vias in the circuit board; and a heat sink coupled to the plurality of thermal vias, where the heat sink is thermally coupled to the frame of the wearable device. The wearable device where the plurality of thermal vias and the heat sink include a metal. The wearable device where the mm-wave gesture sensing system includes an RF system, the RF system including: a plurality of receive antennas; a plurality of transmit antennas; and a front-end circuit including a plurality of receive circuits coupled to the plurality of receive antennas and a plurality of transmit circuits coupled to the plurality of transmit antennas. The wearable device where the mm-wave gesture sensing system further includes: a clock circuit coupled the RF system; a plurality of amplifiers coupled to RF system; a plurality of analog-to-digital converters coupled to corresponding outputs of the plurality of amplifiers; and an application processor coupled to outputs of the plurality of analog-to-digital converters. The wearable device where the RF system is a package, the package including: an RF chip embedded in a molding layer; one or more redistribution lines over the RF chip and the molding layer; and a plurality of connectors coupled to one or more redistribution lines. The wearable device where the plurality of receive antennas and the plurality of transmit antennas are formed within one or more redistribution layers. The wearable device where the RF system is mounted on the circuit board using the plurality of connectors. The wearable device where a top portion of the frame surrounding the display includes a metal. The wearable device where a portion of the frame over the mm-wave gesture sensing system is formed of a plastic.

A further general aspect includes a method of operating a wearable device, the method includes: transmitting, by a mm-wave gesture sensing system, a transmitted signal to an object; receiving, by the mm-wave gesture sensing system, a reflected signal from the object; detecting, by the mm-wave gesture sensing system, a first gesture based on the transmitted signal and the reflected signal; and performing, by the wearable device, a first operation based on the first gesture.

Implementations may include one or more of the following features. The method further including: coupling the wearable device to a consumer device using an interface; detecting, by the mm-wave gesture sensing system, a second gesture; generating, by the mm-wave gesture sensing system, a control signal based on the second gesture; transmitting, using the interface, the control signal to the consumer device; and performing, by the consumer device, a second operation based on the control signal. The method where the interface includes at least one of a USB interface, a WiFi interface, a WiGig interface, and a Bluetooth interface. The method where the transmitted signal is transmitted using a plurality of transmit antennas of the mm-wave gesture sensing system. The method where the reflected signal is received using a plurality of receive antennas of the mm-wave gesture sensing system. The method further including comparing, by the mm-wave gesture sensing system, the transmitted signal and the reflected signal.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device comprising:
a frame;
a first circuit board within the frame;
a display over and coupled to the first circuit board;

a second circuit board electrically coupled to the first circuit board; and a mm-wave gesture sensing system mounted on the second circuit board, wherein the mm-wave gesture sensing system comprises:
at least one receive antenna;
at least one transmit antenna;
at least one receive circuit coupled to the at least one receive antenna;
at least one transmit circuit coupled to the at least one transmit antenna;
a clock circuit;
at least one amplifier;
at least one analog-to-digital converter coupled to the at least one amplifier; and
an application processor coupled to the at least one analog-to-digital converter.

2. The device of claim 1, wherein a frequency of operation of the mm-wave gesture sensing system is greater than about 57 GHz.

3. The device of claim 1, wherein the first circuit board and the second circuit board are electrically coupled using a flexible connector.

4. The device of claim 1, wherein a major surface of the second circuit board forms an angle with a major surface of the first circuit board, the angle being between about 0 deg and about 60 deg.

5. The device of claim 1, wherein the at least one receive antenna, the at least one transmit antenna, the at least one receive circuit and the at least one transmit circuit are integrated into a package.

6. The device of claim 5, wherein the package comprises:
an RF chip embedded in a molding layer;
one or more redistribution layers over the RF chip and the molding layer; and
a plurality of connectors coupled to the one or more redistribution layers.

7. The device of claim 6, wherein the at least one receive antenna and the at least one transmit antenna are formed within the one or more redistribution layers.

8. A device comprising:
a frame;
a circuit board within the frame;
a mm-wave gesture sensing system mounted on a first portion of the circuit board, wherein the mm-wave gesture sensing system comprises:
an RF chip embedded in a molding layer, the RF chip comprising a receive circuit and a transmit circuit; and
one or more redistribution layers over the RF chip and the molding layer, the one or more redistribution layers comprising a receive antenna coupled to the receive circuit and a transmit antenna coupled to the transmit circuit; and
a display coupled to the circuit board, the display being disposed over a second portion of the circuit board.

9. The device of claim 8, wherein the first portion of the circuit board is separate from the second portion of the circuit board, and wherein the first portion of the circuit board and the second portion of the circuit board are electrically coupled using a flexible connector.

10. The device of claim 8, wherein a frequency of operation of the mm-wave gesture sensing system is greater than about 57 GHz.

11. The device of claim 8, wherein the mm-wave gesture sensing system further comprises:
a clock circuit;
an amplifier;
an analog-to-digital converter coupled to an output of the amplifier; and
an application processor coupled to an output of the analog-to-digital converter.

12. The device of claim 8, wherein a total area of all components of the mm-wave gesture sensing system is about 218.5 $mm^2$.

13. The device of claim 8, wherein the one or more redistribution layers are coupled to the circuit board using a plurality of connectors.

14. The device of claim 8, wherein a range of the mm-wave gesture sensing system is between about 5 m and about 10 m.

15. A method of operating a device, the method comprises:
transmitting, by a mm-wave gesture sensing system of the device, a transmitted signal to an object;
receiving, by the mm-wave gesture sensing system, a reflected signal from the object;
detecting, by the mm-wave gesture sensing system, a first gesture based on the transmitted signal and the reflected signal; and
performing, by the device, a first operation based on the first gesture, wherein the device comprises:
a frame;
a first circuit board within the frame;
a display over and coupled to the first circuit board;
a second circuit board electrically coupled to the first circuit board; and
the mm-wave gesture sensing system mounted on the second circuit board, wherein the mm-wave gesture sensing system comprises:
an RF chip embedded in a molding layer, the RF chip comprising a receive circuit and a transmit circuit; and
one or more redistribution layers over the RF chip and the molding layer, the one or more redistribution layers comprising a receive antenna coupled to the receive circuit and a transmit antenna coupled to the transmit circuit.

16. The method of claim 15, further comprising:
coupling the device to a second device using an interface;
detecting, by the mm-wave gesture sensing system, a second gesture;
generating, by the mm-wave gesture sensing system, a control signal based on the second gesture;
transmitting, using the interface, the control signal to the second device; and
performing, by the second device, a second operation based on the control signal.

17. The method of claim 15, wherein a frequency of operation of the mm-wave gesture sensing system is greater than about 57 GHz.

18. The method of claim 15, wherein the transmitted signal is transmitted using the transmit antenna of the mm-wave gesture sensing system.

19. The method of claim 15, wherein the reflected signal is received using the receive antenna of the mm-wave gesture sensing system.

20. The method of claim 15, further comprising comparing, by the mm-wave gesture sensing system, the transmitted signal to the reflected signal.

* * * * *